(12) United States Patent
Laurila et al.

(10) Patent No.: US 9,081,986 B2
(45) Date of Patent: Jul. 14, 2015

(54) METHOD AND APPARATUS FOR USER INFORMATION EXCHANGE

(75) Inventors: Juha K. Laurila, St-Legier (CH); Debmalya Biswas, Lausanne (CH)

(73) Assignee: Nokia Technologies Oy, Espoo (FI)

( * ) Notice: Subject to any disclaimer, the term of this patent is extended or adjusted under 35 U.S.C. 154(b) by 34 days.

(21) Appl. No.: 13/465,284

(22) Filed: May 7, 2012

(65) Prior Publication Data

US 2013/0298247 A1 Nov. 7, 2013

(51) Int. Cl.
*G06F 21/00* (2013.01)
*G06F 21/62* (2013.01)

(52) U.S. Cl.
CPC .................................. *G06F 21/6245* (2013.01)

(58) Field of Classification Search
None
See application file for complete search history.

(56) References Cited

U.S. PATENT DOCUMENTS

| | | | |
|---|---|---|---|
| 7,133,838 B2 | 11/2006 | Tokuma | 705/26 |
| 7,478,157 B2 | 1/2009 | Bohrer et al. | 709/226 |
| 2002/0019817 A1 | 2/2002 | Matsui et al. | 707/1 |
| 2002/0173295 A1 | 11/2002 | Nykanen et al. | 455/414 |
| 2002/0188563 A1 | 12/2002 | Isaji et al. | 705/41 |
| 2003/0110076 A1 | 6/2003 | Holt | 705/14 |
| 2004/0176104 A1 | 9/2004 | Arcens | 455/456.3 |
| 2004/0215517 A1* | 10/2004 | Chen et al. | 705/14 |
| 2005/0171917 A1* | 8/2005 | Femenia et al. | 705/80 |
| 2006/0259950 A1 | 11/2006 | Mattsson | 726/1 |
| 2007/0143824 A1 | 6/2007 | Shahbazi | 726/1 |
| 2008/0196083 A1 | 8/2008 | Parks et al. | 726/1 |
| 2008/0215509 A1 | 9/2008 | Charlton | 706/11 |
| 2009/0025057 A1 | 1/2009 | Mattsson | 726/1 |
| 2009/0300716 A1 | 12/2009 | Ahn | 726/1 |
| 2009/0307743 A1 | 12/2009 | Azagury et al. | 726/1 |
| 2010/0077484 A1 | 3/2010 | Paretti et al. | 726/26 |
| 2010/0257577 A1 | 10/2010 | Grandison et al. | 726/1 |
| 2011/0030067 A1 | 2/2011 | Wilson | 726/27 |
| 2011/0225200 A1 | 9/2011 | Danis et al. | 707/783 |
| 2011/0307600 A1 | 12/2011 | Polley et al. | 709/224 |
| 2013/0035944 A1* | 2/2013 | Hurwitz et al. | 705/1.1 |

FOREIGN PATENT DOCUMENTS

| | | |
|---|---|---|
| JP | 2006235984 A | 9/2006 |
| JP | 2010097336 A | 4/2010 |
| WO | WO-2009/079403 A1 | 6/2009 |

OTHER PUBLICATIONS

"Secure My Wireless Blog", Verizon Wireless to Sell Customers' Data to Advertisers, Oct. 21, 2011, 2 pgs.

* cited by examiner

*Primary Examiner* — Ghazal Shehni
(74) *Attorney, Agent, or Firm* — Harrington & Smith

(57) ABSTRACT

Methods and apparatus for negotiation of data sharing arrangements. A user profile vector comprising user data is defined according to user selections and privacy and cost information relating to the user profile vector are computed. The user profile vector and service provider data requests by service providers are compared, and data sharing arrangements are entered into when a match is identified between the user profile vector and a provider data request. Data collection and sharing is conducted in accordance with the arrangements.

20 Claims, 6 Drawing Sheets

METHOD AND APPARATUS FOR USER INFORMATION EXCHANGE

TECHNICAL FIELD

The example and non-limiting embodiments of this invention relate generally to user devices, methods and computer programs and, more specifically, relate to the control of a user's personal data.

BACKGROUND

Modern user devices such as smartphones, tablets, notebooks, electronic readers and the like typically include, in addition to wireless communication capabilities, one or more sensors that can detect and/or infer the context of the device and, by extension, contextual information of the user. One example is the use of a position or location determining sensor such as a global positioning system (GPS) receiver.

In addition to the large amount of personal data stored on these user devices (messaging logs, call logs, contacts list, etc.) many sensors can be used to infer the location, context, personal habits, etc. of the user. This information may be exposed to privacy threats from third party applications that the user installs, but does not necessarily trust. Such third party applications may record and share personal information without the user's consent. On the other hand, given the value of such information for service providers, the user himself may be interested in sharing private data with service providers for an appropriate benefit or price, while still protecting his or her privacy to a desired degree.

SUMMARY

The foregoing and other problems may be overcome, and other advantages realized, in accordance with the example embodiments.

In one embodiment, an apparatus comprises at least one processor and memory storing computer program code. The computer program code is configured to, with the memory and the at least one processor, cause the apparatus to perform actions comprising at least assembling a set of user selections for sharing of user data, wherein the user selections are chosen from among alternatives affording varying degrees of privacy to the user, and presenting the user selections in a negotiation for data sharing between the user and a service provider.

In another embodiment of the invention, a method comprises configuring at least assembling a set of user selections for sharing of user data, wherein the user selections are chosen from among alternatives affording varying degrees of privacy to the user, and presenting the user selections in a negotiation for data sharing between the user and a service provider.

In another embodiment of the invention, a computer readable medium stores a set of program instructions. Execution of the program instructions by a processor configures an apparatus to perform actions comprising at least assembling a set of user selections for sharing of user data, wherein the user selections are chosen from among alternatives affording varying degrees of privacy to the user, and presenting the user selections in a negotiation for data sharing between the user and a service provider.

In another embodiment of the invention, a method comprises configuring at least one processor to cause an apparatus to perform actions comprising at least receiving user and service provider specifications for data sharing arrangements between the user and the service provider, wherein the specifications, relate to user selections for data sharing, and wherein the user selections are taken from alternatives affording varying degrees of privacy to the user, and determining that a match occurs when the specifications, requested incentives, and offered incentives, match according to a specified set of criteria.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (including derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of originally filed claims 1-.

Other aspects, features, and advantages of the invention are clearly apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DETAILED DESCRIPTION

Figure 1:
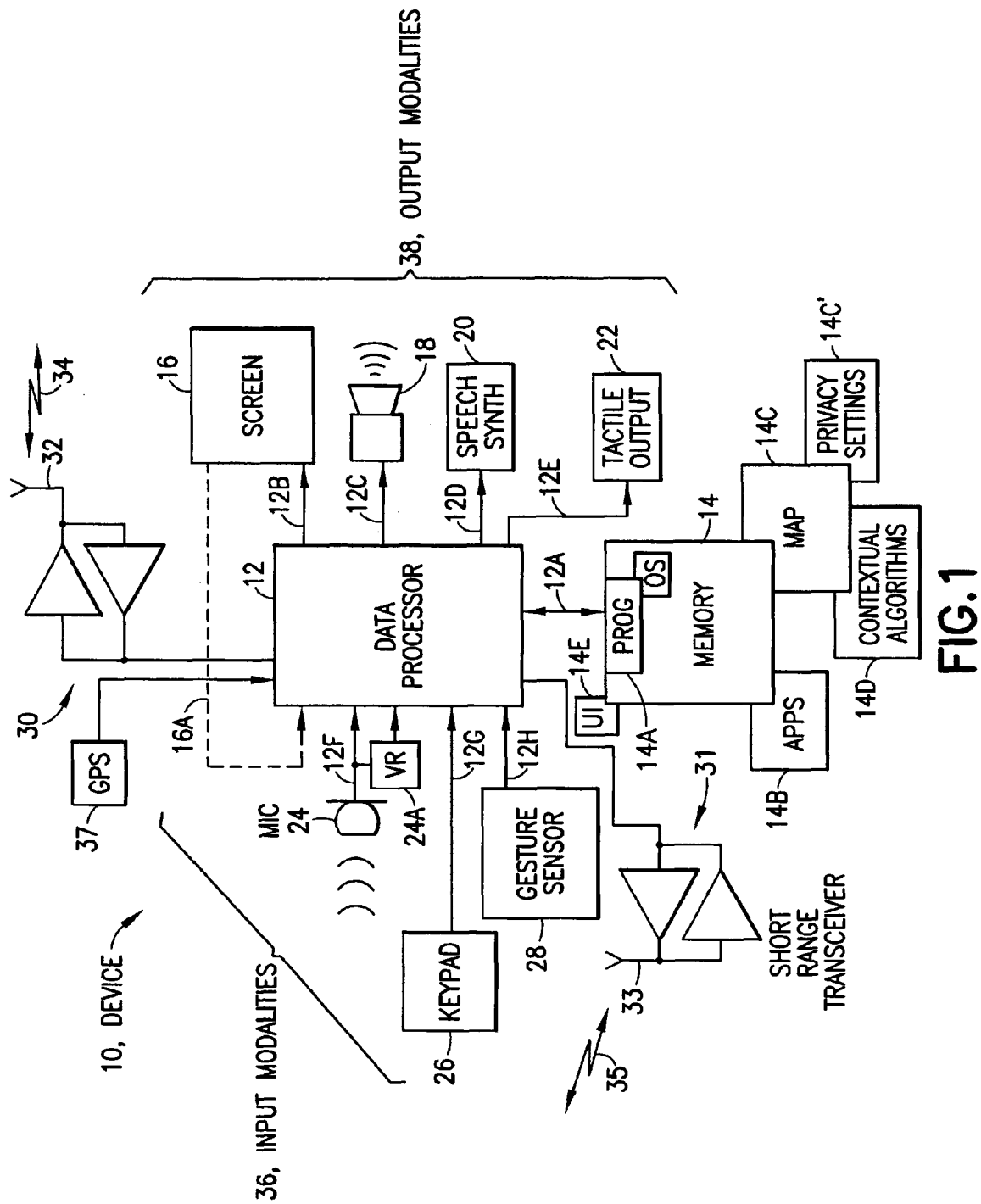
FIG. 1 is a block diagram of an example device suitable for practicing at least one embodiment.

In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

As noted above, smartphones and other highly capable user data communication and processing devices are becoming ubiquitous. The sensors present in these devices can be used to infer very personal real-time contextual information about the user, such as location, activities, habitual behaviors. Having access to this wealth of information about the user would allow service providers to provide highly context sensitive services to the user. However, many users are reluctant to share this information with service providers due to the considerable privacy implications if this data is compromised and misused.

It will be recognized that many commodities in which two parties have an interest can be the subject of transactions between the parties. In the case of privacy-sensitive information, the nature of the information leads to its potential as the subject of a transaction. A service provider may wish to use privacy-sensitive data of a user, and a user may wish to prevent the use of that data by others. However, a user may be persuaded to allow the use of privacy-sensitive data by specified providers if given sufficient incentives to allow such use. Incentives might take the form of cash payments, credits for services, or special services that require the use of privacy-sensitive information to function.

One challenge faced by users and providers who may wish to conduct transactions is the difficulty of valuing information. One mechanism for setting a value is based on recognition of the fact that more privacy-sensitive information is more likely to reveal specific facts about a user and therefore more valuable to a service provider. At the same time, the sharing of more privacy-sensitive information is more likely to be resisted by the user. The same factors, therefore, tend to increase the perception of value of information by both a user making a decision about whether to share the information and a provider deciding on incentives to offer a user in exchange for the information.

Therefore, one or more embodiments employ mechanisms that produce a privacy score for privacy-sensitive information or for settings that allow the release of privacy-sensitive information. The privacy score indicates the impact of the settings on the user's privacy, and may be based on standardized default weightings of various factors affecting privacy. Such an approach is convenient for a user, because users will in many cases be expected to have similar concerns relating to various types of information and the impact on privacy of sharing such information. A user may, however, make specific selections rather than the default selections for some or all of the factors, so as to generate a privacy score based on the user's specific concerns.

Mechanisms according to one embodiment provide a privacy analysis interface allowing a user to make selections specifying information to be shared and the conditions under which is to be shared, and to see a privacy score resulting from the selections. If the user changes selections, an updated privacy score will be generated and provided to the user. A user's selections may be recorded in a profile, which may be called a user profile vector or UPV. A user's UPV may be submitted to a privacy services marketplace. Service providers, such as advertisers or application developers also submit information to the privacy services marketplace. Such service providers may offer inducements for the sharing of information, such as payments or access to applications or services, and may specify in the privacy services marketplace the privacy settings required in exchange for the inducements. Users and service providers may enter into negotiations in the privacy services marketplace, and a user may employ his or her privacy analysis interface to determine the privacy impact of a combination of settings required to earn a particular inducement.

FIG. 1 illustrates a simplified block diagram of an example embodiment of an electronic device 10 that is suitable for use in practicing at least some of the example embodiments. In FIG. 1 device 10 includes a data processor 12 that is coupled through a bus 12A with a memory 14 that stores a program (PROG) 14A of instructions that are executable by the data processor 12. The program 14A can include an operating system (OS) and other programs needed to operate the device 10. The device 10 may further include a plurality of input and output devices and subsystems, referred to herein also as input modalities 36 and output modalities 38. As exemplary output devices there may one or more of a visual display screen 16, such as an LCD or a plasma display screen, an acoustic output transducer such as a loudspeaker 18, a speech synthesis subsystem 20 having an output that can be played through the loudspeaker 18 (or through another acoustic output transducer), and a tactile output device or transducer 22, such as a vibratory device (e.g., a piezoelectric transducer). These output devices are coupled to corresponding output paths 12B, 12C, 12D and 12E from the data processor 12. As exemplary input devices there may one or more of an acoustic input transducer such as a microphone 24, an associated speech or voice recognition function (VR) 24A, a keypad or keyboard 26 and a gesture sensor 28, such as a device that is responsive to a rotation about at least one axis and/or to a force applied by a user's finger or stylus, such as when making a tapping gesture. These input devices are coupled to corresponding input paths 12F, 12G and 12H to the data processor 12. If the screen 16 is a touch-sensitive screen then there may also be an input 16A from the screen 16 to the data processor 12. In this case the input to the data processor 12 may represent activation of a virtual key or button by the user, as opposed to the use of the keypad/keyboard 26 where the input signal may represent activation of a physical key or button (such as an alphanumeric key or a physical 'soft' key or button). The microphone 24 may be coupled with the speech recognition functionality of the device 10 (the VR 24A) whereby a word or words spoken by the user can be interpreted by the data processor 12 as representing a command.

It should be appreciated that the data processor block 12 may actually comprise a number of circuit types, in addition to a data processor per se, such as analog-to-digital converters and digital-to-analog converters that support the operation of the various input modalities 36 and output modalities 38.

The device 10 may also comprise mechanisms for location determination or navigation, such as a global positioning system (GPS) module 37.

It should be appreciated that at least some of the input modalities 36 can be referred to as sensors belonging to the device 10. Non-limiting examples of such sensors are, for example, the microphone 24, the gesture sensor 28 and the GPS module 37. Other exemplary sensors are described below.

It will be recognized that the specific device 10, and the specific combination of sensors belonging to or used by the device 10, are exemplary. Examples of various sensors and functions relating to or carried out using the sensors can include, as non-limiting examples, GPS, wireless networking, bluetooth, Cell ID, Call logs, short message service (SMS), Audio, Accelerometer, contact information, such as an address book, calendar information, pictures, music, International Mobile Equipment Identity (IMEI), International Mobile Subscriber Identity (IMSI), Device profile, Ring type, Battery (charge) level and Charging indicator. Any one of these various functional units and user or device related information can be referred to below simply as a "sensor".

In various exemplary embodiments the device 10 has user communication capabilities and includes a suitable transceiver 30, such as a radio frequency transceiver coupled with at least one antenna 32 for conducting wireless communications through a bidirectional long range radio frequency link 34, which may be, for example, a link to a cellular communication network). The cellular communication network can be compliant with any type of cellular communication network including, for example, GSM, LTE, LTE-A, and so forth. The use of this invention is not contingent on the use of any particular type of cellular network, or any use of a cellular network, because it will be recognized that a device such as the device 10 may be equipped to communicate using wireless local area networking, for example. The device 10 may thus also include a second transceiver 31 coupled with at least one antenna 33 to a short range radio frequency link 35, such as a low power radio frequency link that may be a Bluetooth™ (BT) link or a WiFi link. In other embodiments the transceiver 31 may be optically based and may then include suitable optical source and detector components, such as an infrared emitter and an infrared detector.

It will be recognized that the various input modalities 36 and output modalities 38 are exemplary, and not all may be present in a given implementation. For example, the example embodiments may be used with the display screen 16 and the keypad/keyboard 26, or the display screen 16 alone if the screen is a touch sensitive providing mechanisms for the user to enter information and commands. In some embodiments, the user interface could be based solely on the use of voice recognition and voice synthesis, with no need for a touch sensitive display screen.

The program 14A is assumed to include program instructions that, when executed by the data processor 12, enable the electronic device 10 to operate in accordance with the example embodiments as will be discussed below in greater detail. The program 14A can include the OS and any associated file system utilities depending on the implementation of the software architecture of the device 10.

In general, the various embodiments of the device 10 can include, but are not limited to, phones, smartphones, personal digital assistants (PDAs) possibly having wireless communication capabilities, portable computers possibly having wireless communication capabilities, GPS devices possibly having wireless communication capabilities, image capture devices such as digital cameras possibly having wireless communication capabilities, gaming devices possibly having wireless communication capabilities, music storage and playback appliances possibly having wireless communication capabilities, Internet appliances permitting wireless or wired Internet access and browsing, as well as portable units or terminals that incorporate combinations of such functions.

At least some of the example embodiments may be implemented by computer software executable by the data processor 12, or by hardware, or by a combination of software and hardware (and firmware).

The memory 14 may be of any type suitable to the local technical environment and may be implemented using any suitable data storage technology, such as semiconductor-based memory devices, flash memory, magnetic memory devices and systems, optical memory devices and systems, fixed memory and removable memory. The data processor 12 may be of any type suitable to the local technical environment, and may include one or more of general purpose computers, special purpose computers, microprocessors, digital signal processors (DSPs) and processors based on multi-core processor architectures, as non-limiting examples.

The memory 14 is shown as including computer program code that implements the various apps (application programs) 14B that can be pre-installed in the device 10 or subsequently installed by the user, such as by being downloaded via one of the radio frequency links 34 or 35. The above-mentioned map that converts high level user privacy settings to low level sensor access patterns can be stored as part of the MAP 14C in the memory 14. The MAP 14C can also include a data structure along the lines of the one depicted in FIG. 4 and described below, in addition to various software modules that operate to populate the data structure based on user input (e.g., see FIGS. 3A, 3B) and interpret the data structure in light of sensor usage or attempted sensor usage by the apps 14B. Associated with the MAP 14C can be stored user privacy settings 14C', or these privacy settings can be assumed to be implicit in the data structure shown in FIG. 4. The memory 14 can also store the above mention contextual algorithms as Contextual Algorithms 14D. The memory 14 also stores computer software that implements a privacy user interface (UI) 14E that operates in conjunction with the input modalities 36 and the output modalities 38. Aspects of the privacy UI 14E are described in detail below.

The Contextual Algorithms 14D can be considered to encompass those algorithms that are used to determine user context based on (possibly low level) sensor readings of the user's device 10. For example, and in a simple case, one Contextual Algorithm 14D can be one that determines user activity (e.g., if the user is walking, running, sitting in a moving vehicle, gesturing with his hands, etc.) based on accelerometer readings. At least some of the example embodiments may intercept such low level sensor readings and then use the Contextual Algorithms 14D to determine the context information that can be inferred about the user. Noteworthy in this regard is that the more personal information that can be inferred, the greater is the user's privacy risk.

Users may manage their privacy information using a user profile vector. Personal data collected by a user device may be maintained as a profile vector, referred to as the User Profile Vector (UPV). The data is collected by monitoring the various input devices including sensors, which may include an accelerometer and GPS module or file system, camera, microphone, Bluetooth, and the like. For convenience, the various input devices and sensing devices may all be referred to as sensors.

The UPV may be maintained as a hierarchical data structure with higher levels representing user data at a higher level of abstraction. At the lowest level may be raw time-stamped sensor readings or inputs. Data can be collected whenever the sensor value changes, at a pre-defined frequency, or based on a more complex access pattern, such as collecting data with frequency F when the user is at location L).

Information at higher levels of abstraction may comprise inferences from sensor readings. Higher level information may comprise, for example, location, social connections, activities, and the like. Exemplary higher level values may be a set of locations frequented or activities performed by the users, together with the cumulative amount of time spent at each location or performing each activity, a list of social networking platforms used with a summary of activities at each site including time spent performing each such activity, such as chatting, posting messages, or uploading pictures. Higher level data may lack time stamps, and thus may, for example, reveal the locations visited by a user but not the specific time at which a user was at a particular location. Still higher levels may represent still higher levels of abstraction, such as locations visited in a city to city, cities visited in a country, and so on. Different types of data may be structured into different number of levels.

As noted above, some example embodiments provide mechanisms to assign a value to personal data, based on the impacts to privacy of sharing the data. The assignment of value comprises computing metrics quantifying the privacy impact of sharing a subset of the UPV information with service providers. Quantifying loss of privacy is a complex process even for the more privacy aware users given the amount and diversity of data maintained in the UPV.

Privacy metrics are computed for data in a UPV to give the data in the UPV an overall aggregate score S. S can for instance be represented as % loss of privacy for each of the categories in the UPV. While it is easy to see that for a data category, the privacy score would decrease as the level of abstraction increases (location information revealed at the country level is less privacy sensitive than revealed at the city level), the computation becomes more complex when performed in conjunction with the sharing of multiple categories at different levels of abstraction.

Computation of time intervals may also be taken into account in computation of a privacy score. A user may be interested, for example, in sharing his historical data as giving access to his real-time time data to service providers. In the former case, the age of data is an important factor in computing the privacy score. For some types of data, the older data may cause less impairment of privacy, but may also provide less value to recipients. Access to real time data has a greater impact on privacy if it is given for a longer time, and a lesser impact if given for a shorter time.

The privacy score S can be computed as follows:

$$S \sim PM(\{(Cat_1, abs_1, age_1), (Cat_2, abs_2, age_2), \ldots\}) \rightarrow \{(Cat_1, S_1), (Cat_2, S_2), \ldots\}$$

where Cat, abs and and age refer to the category of data, corresponding level of abstraction, and age, respectively. Access to historical data and access to real-time data, where such access extends into a future period, may be denoted by −ve and +ve intervals respectively. For example, access to 2 years' past historical data may be designated as −2 and agreement to share a category of data for the next 2 years may be designated as +2.

The computed privacy score S may be mapped to a cost C for use by the privacy services clearing system 200 as follows:

$$C \sim S \times \{(Cat1, w_1), (Cat_2, w2), \ldots\} = \{(Cat1, S_1), (Cat_2, S_2), \ldots\} \times \{(Cat1, w_1), (Cat_2, w_2), \ldots\},$$

where $w_1, w_2, \ldots$ are the weights assigned to their respective categories $Cat_1, Cat_2, \ldots$ The weights take into consideration external factors affecting the user privacy.

Weights are especially applicable to categories with whose actual or perceived privacy impacts have a wide variability among users. One such factor is user sensitivity to a category. Different users have different perceptions and requirements with respect to private data falling into different categories. For instance, social connections may be more privacy sensitive than location for someone who does not travel much. Weighting allows the cost to be computed in a way customized to the concerns of a user.

Weights are also particularly useful with respect to environmental factors, because different environmental factors influence the impact of information categories for different users. For example, location information may not have much an effect on privacy for a user living in a small village in which the general location of the user, or even the user's specific residence, may be deduced from social and geographical factors, without a need for explicit location information. For such a user, location information may be given a lower weight.

Figure 2:
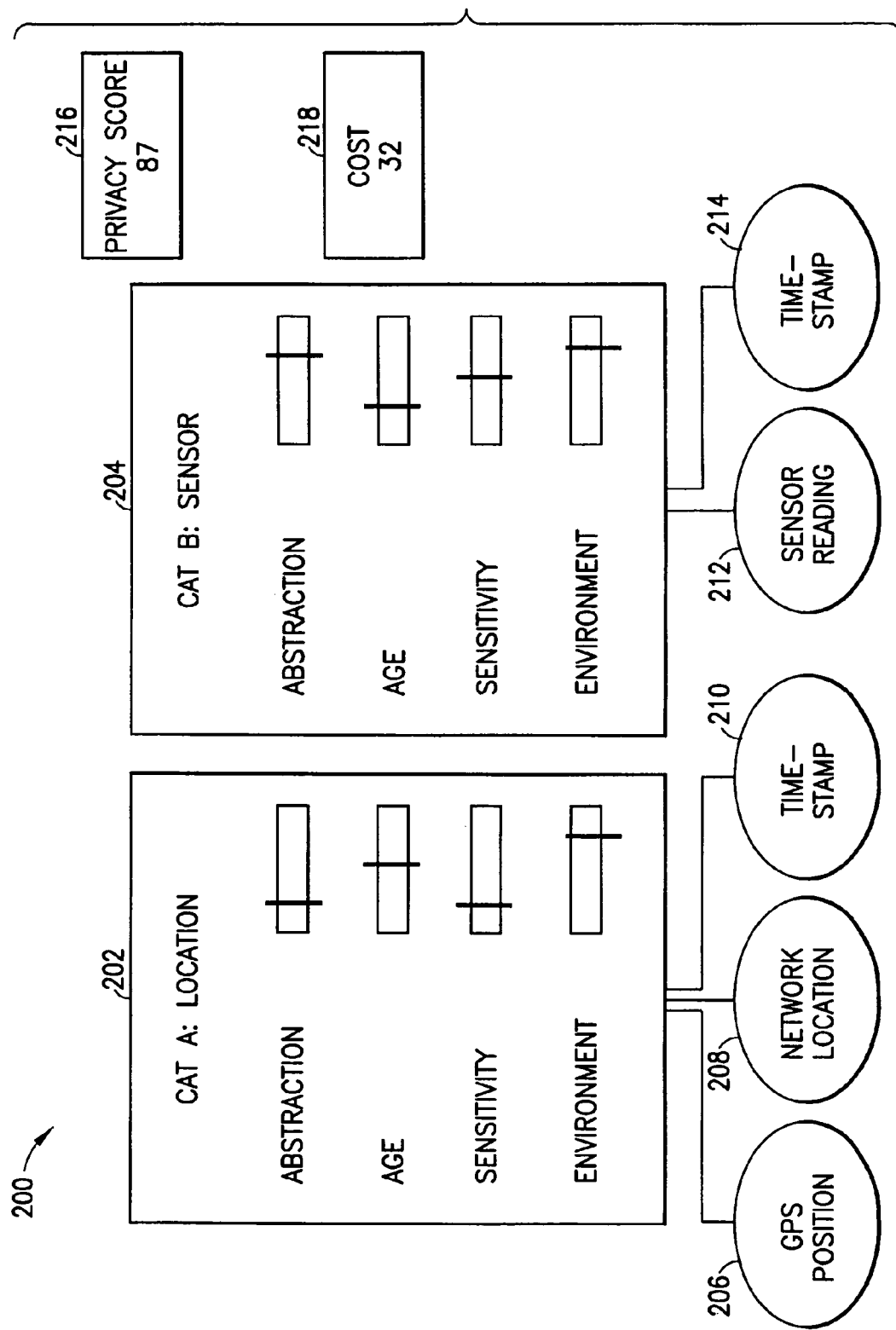
FIG. 2 illustrates a user interface, according to one embodiment.

FIG. 2 illustrates a user interface 200, presenting user selection forms 202 and 204, allowing the user to make changes to factors relating to location and sensor settings, respectively. The factors 206, 208, and 210, which are GPS location, network location and timestamp, respectively, are shown as contributing to the location information, and the factors 212 and 214, which are sensor reading and sensor timestamp, respectively, are shown as contributing to the sensor information. For each of the two categories of data shown, the user may make selections to increase or decrease the level of abstraction at which data is shared, age of data, user sensitivity, and environmental weighting. It will be recognized that information relating to other privacy factors may, and typically will, be presented for adjustment by the user, and that adjustments will be reflected in the privacy score and privacy cost, shown in windows 216 and 218, respectively.

Based on the entered values, the system displays the privacy impact of sharing his UPV data (computed based on the Privacy Metrics as discussed above). This user is able to evaluate settings by making adjustments and observing the change in the displayed privacy score and privacy cost. The user is then able to determine what sharing to allow and what compensation to request or accept in exchange for such sharing. The user is able to change his or her settings at any time.

Figure 3:
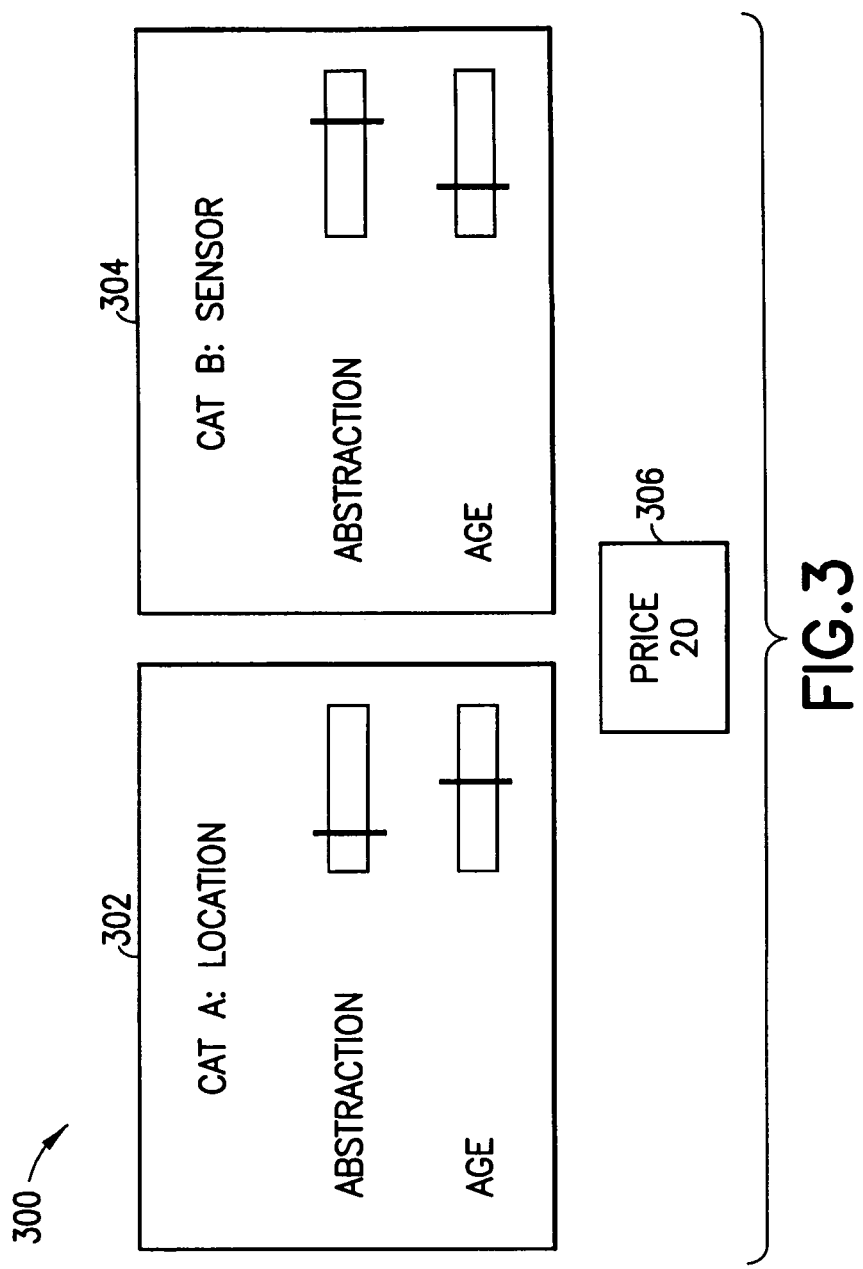
FIG. 3 illustrates a service provider interface, according to one embodiment.

FIG. 3 illustrates an interface that may be used by a service provider, such as an advertiser, to specify requirements for information to be provided by users. The service provider specifies the abstraction level and age for location and sensor data. The service provider does not specify sensitivity and environment, because these characteristics do not affect the actual nature of the information to be provided; they merely affect the privacy implications of the information with respect to the specific user. The service provider specifies a price to be offered for information meeting the specified criteria, entering it in the box 306.

A marketplace provides a platform for both users and service providers to negotiate the terms for data sharing. Both users and service providers may advertise their requirements at the marketplace, presenting profiles to indicate their requirements and offers. An advertiser A, for example, may express a profile as follows:

$$Pr_A = C_A, \{(Cat_{1A}, abs_{1A}, age_{1A}, V_{1A}), (Cat_{2A}, abs_{2A}, age_{2A}, V_{2A}), \ldots\}$$

where Cat, abs, and age refer to the data categories of interest together with their associated levels of abstraction and age. The additional parameter in this case is the set of values $V=\{v_1, v_2, \ldots\}$ which allows a provider to further specify that it is interested only in users satisfying the specified set or subset of values for the corresponding data category and level of abstraction. C denotes the price the advertiser is willing to pay for the data. In case of advertisers, or service providers in general the prices can also be in terms of the services the providers can provide to the users in exchange for their data.

A user U, as after exploring different subsets of his UPV data with respect to privacy risks and cost in a manner such as that described above, may advertise his data as follows:

$$U_{Pr}=C_U,\{(Cat_{1U},abs_{1U},age_{1U},V_{1U}),(Cat_{2U},abs_{2U},age_{2U},V_{2U}),\ldots\}$$

Given the two profiles, a matchmaking module is run to find matching entries. Basically, $A_{Pr}$ and $U_{Pr}$ match if $$C_U<=C_A \text{ and}$$

for each $Cat_i$,
  $abs_{iU}<=abs_{iA}$
  $age_{iU}>=age_{iA}$ (while respecting the +ve/−ve signs)
  $V_{iA}$ is a subset of $V_{iU}$ Matchmaking may be performed, for example, by a trusted third party hosting the marketplace, as illustrated in additional detail below, or may be performed by either or both of a suitably equipped and configured user device and service provider device.

Figure 4:
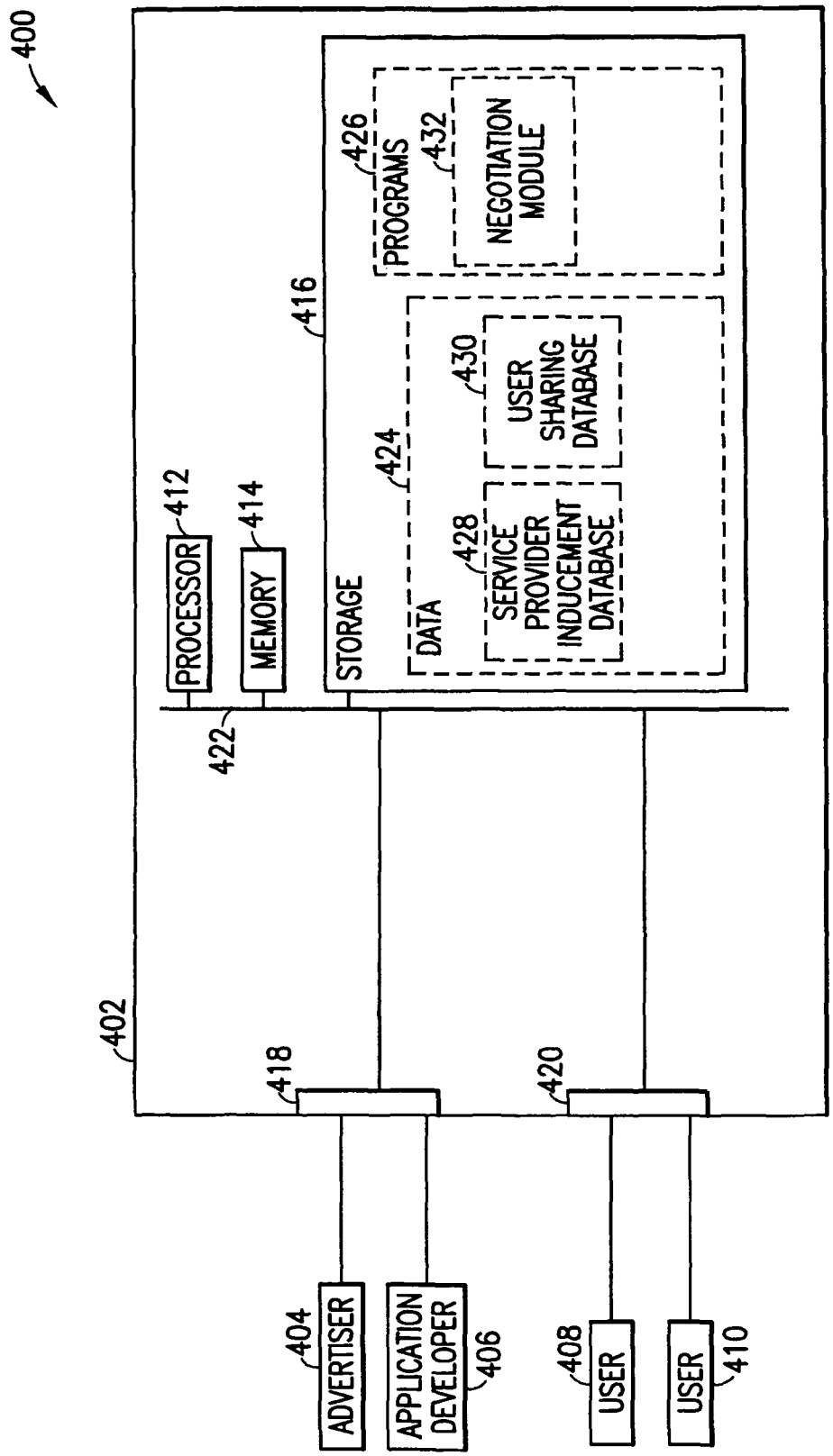
FIG. 4 illustrates an information exchange system, according to one embodiment.

FIG. 4 illustrates a privacy services clearing system 400 according to one embodiment. The system 400 may comprise a negotiation marketplace 402, serving advertisers 404, application developers 406, and users, represented here by exemplary user devices 408 and 410. The user devices 408 and 410 may be similar to the device 10 of FIG. 1. The negotiation marketplace 402 may be a suitably configured data processing system, providing interfaces to various participants in transactions and data storage and processing elements to conduct presentation of offers and acceptances between parties and conclusions of transactions. The negotiation marketplace 402 may comprise, for example, a processor 412, memory 414, storage 416, provider interface 418, and user interface 420, communicating over a bus 422. The negotiation marketplace 402 may also comprise data 424 and programs 426, suitably residing in storage 416 and transferred to memory 414 as needed for use by the processor 412. The data 424 may comprise, for example, a service provider inducement database 428 storing inducements offered by providers to users in exchange for sharing of data, with an inducement being associated with a set of specifications required by the provider in exchange for the inducement. The data 414 may further comprise a user sharing database 430, storing user profile vector information specifying user privacy settings, with each user profile vector being associated with pricing information required for sharing of information. The pricing information may reflect cash or non-cash pricing, and may also reflect alternative cash and non-cash pricing. For example, a user may wish to receive a cash payment in exchange for sharing information, or may wish to receive non-cash incentives, such as applications, information, or entertainment content such as video or audio. Depending on user preferences, the pricing information may be concealed, particularly in the case of cash incentives, so that a user may receive a bid from a service provider that may be for more than the minimum the user is willing to accept. The negotiation marketplace 402 may also comprise a negotiation module 432, which matches service provider inducements and user information, and informing parties when a transaction has been successfully concluded. The negotiation module 432 may control the information shared between parties during a transaction, and may conduct transactions in such a way that information that is private to one party is not used to the advantage of the other party. In the case of a negotiation of a cash price, for example, the negotiation module 432 may manage the user's asking price and the service provider's bidding price separately. The negotiation module 432 may, for example present a service provider's bidding price starting with a minimum, and may then increase the bidding price in increments until the user's price is matched. Alternatively or in addition, the negotiation module 432 may manage competitive bidding among service providers without using information from one service provider to the advantage of another, or revealing a service provider's maximum bid to the user or the user's minimum bid to a service provider. For example, the negotiation module 432 may have access to maximum bids from each of a number of service providers, but may evaluate bids without taking this knowledge into account. The negotiation module 432 may raise bids in increments as long as one provider's maximum bid has not been reached, and may also notify providers when their maximum bids have been exceeded. As a further alternative, the negotiation module 432 may conduct a sealed bid auction, receiving bids from multiple providers and choosing the highest bid.

On a successful match and data sharing agreement, particularly with respect to sharing real-time data in the future, data collection by a user device may be optimized based on the data that needs to be provided to the service provider or providers that are to receive the data. Logging data has an impact on performance, so some example embodiments may suitably perform optimization so that only data required for sharing is collected.

For historical data as well, the user, after analyzing the privacy risks of sharing different subsets of a UPV, can decide on a specific subset of his UPV data to be made available in the marketplace. It is thus sufficient for UPV data collection to be performed only for data corresponding to the chosen subset.

Low-level UPV data corresponds to readings of the various input sources and components residing in or available to a device. Input sources and components may comprise sensors such as a GPS or accelerometer, a microphone, a camera, a file system, a contact list, or any of numerous other input sources and components. Such sources are usually accessed by middleware frameworks such as mobility APIs. One mechanism for configuring a user device is to generate code for collecting the required UPV data in an automated fashion. Optimization is achieved by reading only data required to produce the negotiated UPV data and also storing the data only as long as required, with the length of storage being determined by the age parameter.

For instance, given the following UPV data to be collected:

$$\{(Cat_{1A},abs_{1A},age_{1A},V_{1A}),(Ca_{i2A},abs_{2A},age_{2A},V_{2A}),\ldots\},$$

Only input sources corresponding to the $Cat_{iA}$ categories need to be read with a frequency as determined by $abs_{iA}$. The read data is stored only if it equals one of the data values in $V_{iA}$ (if specified) and needs to be stored only for a period $<=age_{iA}$.

Based on the foregoing it should be apparent that at least some of the example embodiments provide a method, apparatus and computer program(s) to manage sharing of privacy-sensitive information. An important aspect of the example embodiments is the user interface that can present to the user an overall privacy impact of various combinations of selections. Another aspect of one or more embodiments is to for mechanisms for negotiation sharing arrangements between users and interested parties, and in managing collection of data in accordance with such arrangements.

Figure 5:
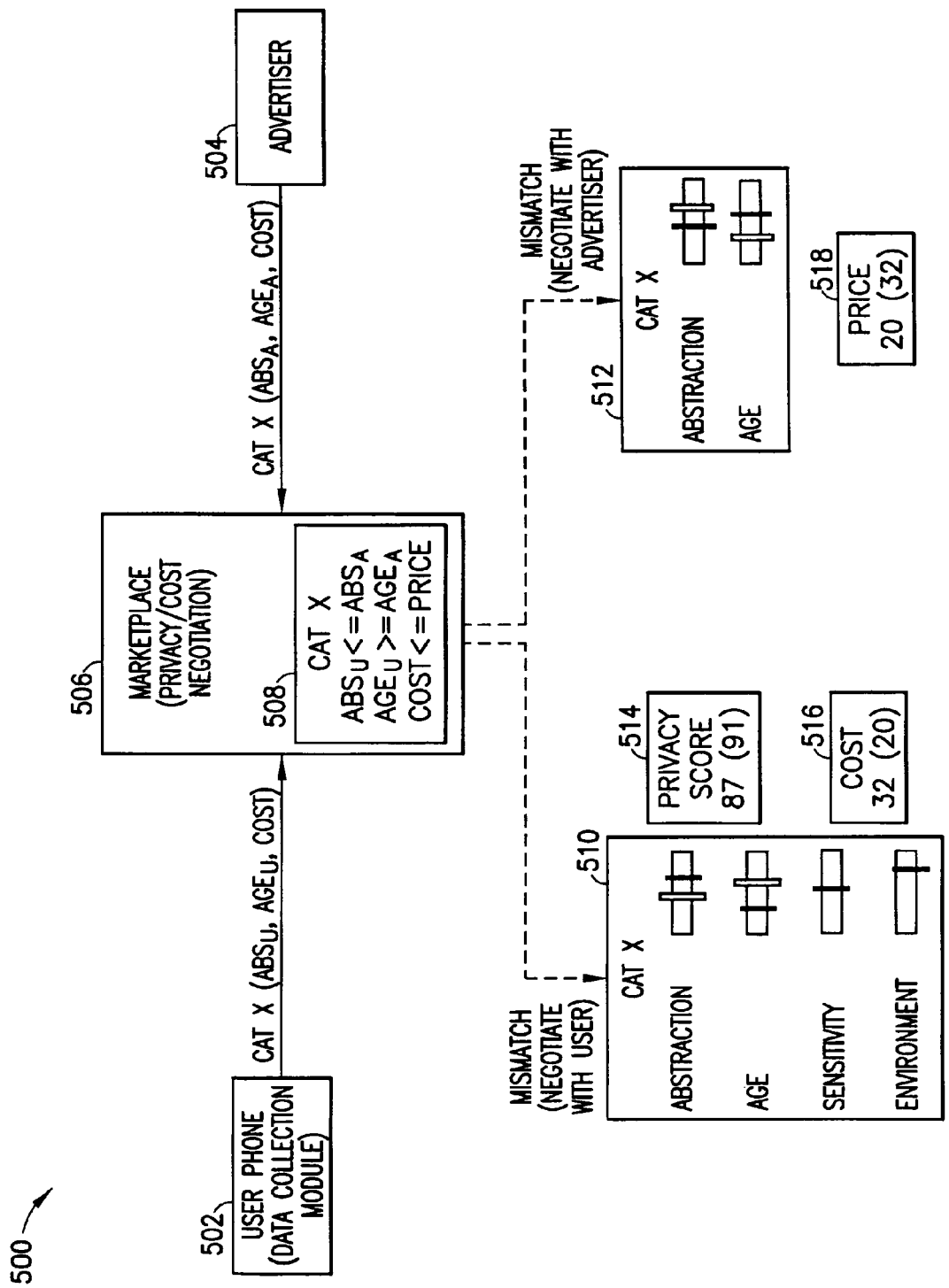
FIG. 5 illustrates the carrying out of a negotiation process, according to one embodiment.

FIG. 5 illustrates components engaging in or managing a negotiation 500 between a user and a service provider, represented by a user device 502 and an advertiser device 504, respectively. A negotiation marketplace 506, which may include components similar to the negotiation marketplace 402 of FIG. 4, is functionally illustrated here as having received and evaluated settings from the user device 502 the advertiser device 504. The results of the evaluation are illustrated in the box 508.

A user interface 510 and an advertiser interface 512 are illustrated, showing user and advertiser selections. The user selections for abstraction, age, sensitivity, and environment are illustrated, as well as the privacy score 514 and cost 516. The advertiser selections for abstraction and age are illustrated, as well as the advertiser's offered price 518. The negotiation marketplace 506 has determined that the user's selections for abstraction and age do not match the advertiser's specifications, and that the user's calculated or entered cost value does not match the advertiser's offered price. The negotiation marketplace 506 has sent information to the user indicating the advertiser's specifications and has sent information to the advertiser indicating the user's selections. The selections are here illustrated in the form of sliders, with the user's sliders 520 and 522 allowing the user to make his or her selections for abstraction and age, respectively, and with the sliders 524 and 526 allowing the advertiser to make its selections for abstraction and age, respectively. The user's selections are reflected in the indicators 532 and 534 appearing on the advertiser's sliders 524 and 526, and the advertiser's specifications are reflected in the indicators 536 and 538 appearing on the user's sliders 520 and 522. As a first party to the negotiation updates his or her settings, the updated information may be sent to the negotiation marketplace 506, which may in turn send updated information to the second party's device, causing the first party's indicators to shift on the other party's display. The parties can therefore see and, if desired, respond to changes in one another's positions.

Figure 6:
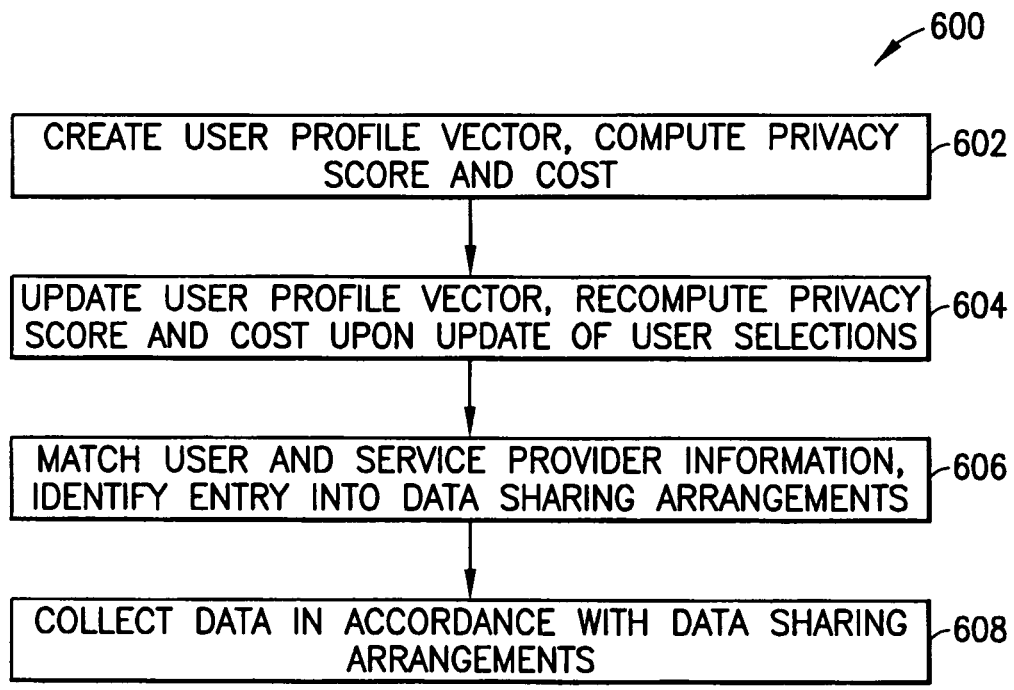
FIG. 6 illustrates a process, according to one embodiment.

FIG. 6 is a logic flow diagram 600 that illustrates the operation of a method, and a result of execution of computer program instructions, in accordance with at least some of the example embodiments. In accordance with these example embodiments a method performs, at step 602, a user profile vector is defined according to user specifications relating to collection and sharing of data, and privacy impact information, such as a privacy score and privacy cost, is computed and presented. At step 604, in response to changes in user selections, a user profile vector is modified, and a new privacy score and privacy cost are calculated and presented. At step 606, user selections and service provider requests are matched and arrangements are entered into for data sharing when matches are identified. At step 608, data is collected and presented to service providers in accordance with data sharing arrangements.

The various steps shown in FIG. 6 may be viewed as method steps, and/or as operations that result from operation of computer program code, and/or as a plurality of coupled logic circuit elements constructed to carry out the associated function(s).

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the example embodiments may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

It should thus be appreciated that at least some aspects of the example embodiments may be practiced in various components such as integrated circuit chips and modules, and that at least some of the example embodiments may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the example embodiments.

Various modifications and adaptations to the foregoing example embodiments may become apparent to those skilled in the relevant arts in view of the foregoing description, when read in conjunction with the accompanying drawings. However, any and all modifications will still fall within the scope of the non-limiting and example embodiments.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Further, the various names used for privacy categories and sub-categories thereof are not intended to be limiting in any respect, as these privacy categories and sub-categories may be identified by any suitable names. Further, the various names assigned to different sensors are not intended to be limiting in any respect, as these various sensors may be identified by any suitable names.

Furthermore, some of the features of the various non-limiting and example embodiments may be used to advantage without the corresponding use of other features. As such, the foregoing description should be considered as merely illustrative of the principles, teachings and example embodiments, and not in limitation thereof.

We claim:

1. A method comprising:
configuring at least one processor to cause an apparatus to perform actions comprising at least:
assembling a set of user selections for sharing of user data, wherein the user selections are chosen from among alternatives affording varying degrees of privacy to the user;
presenting the set of user selections in a negotiation of terms for data sharing between the user and a service provider, wherein the negotiation of terms comprises offering of incentives by the service provider in exchange for data access and offering of data access by the user; and presenting adjustments to user selections as they occur during the negotiation, wherein the adjustments comprise adjustments to the level of data access offered.

2. The method of claim 1, the actions further comprising:
computing a privacy score based on the set of user selections, wherein the privacy score is computed based on the impact of the selections on user privacy; and
computing an individualized cost score based at least in part on the privacy score, wherein the individualized cost score is based at least in part on identified characteristics specific to the user.

3. The method of claim 2, wherein the selections relate to sharing of data categories and wherein the individualized cost score comprises applying a weighting to at least one of the data categories.

4. The method of claim 3, wherein the weighting is based on user sensitivity to sharing of data in the at least one of the data categories.

5. The method of claim 1, further comprising:
determining that an arrangement has been reached in the negotiation for data sharing between the user and a service provider; and
collecting data from at least one sensor of a user device in accordance with the arrangement, wherein collecting data from the at least one sensor comprises optimizing collection of data so that only data required to comply with the arrangement is collected.

6. A method comprising:
configuring at least one processor to cause an apparatus to perform actions comprising at least:
receiving user and service provider specifications for data sharing arrangements between the user and the service provider, wherein the specifications relate to user selections for data sharing, and wherein the user selections are taken from alternatives affording varying degrees of privacy to the user;
receiving information identifying incentives requested by the user for access to data and offered by the service provider for access to the data, wherein the incentives comprise specified incentives for a specified type and level of data access;
receiving updates to any of the user and provider specifications and the information identifying incentives for access to data as one or more of these are updated during a negotiation between the user and the service provider; and
examining user and provider specifications and offered incentives initially and as adjustments are made and determining that a match occurs when the specifications, requested incentives, and offered incentives, match according to a specified set of criteria.

7. The method of claim 6, wherein matching of offered and requested incentives is performed according to a bidding mechanism.

8. The method of claim 7, wherein the bidding mechanism is a competitive auction among service providers.

9. The method of claim 7, wherein the bidding mechanism is a sealed bid auction among service providers.

10. The method of claim 6, wherein a set of values specified by a user for the user's data is a subset of values requested by the service provider.

11. An apparatus comprising:
at least one processor;
at least one memory storing computer program code for one or more programs;
the at least one memory and the computer program code configured to, with the at least one processor, cause the apparatus to perform actions comprising at least:
assembling a set of user selections for sharing of user data, wherein the user selections belonging to the set are chosen from among alternatives affording varying degrees of privacy to the user;
presenting the set of user selections in a negotiation of terms for user data sharing between the user and a service provider, wherein the negotiation of terms comprises offering of incentives by the service provider in exchange for data access and offering of data access by the user; and
presenting adjustments to user selections as they occur during the negotiation, wherein the adjustments comprise adjustments to the level of data access offered.

12. The apparatus of claim 11, the actions further comprising:
computing a privacy score based, at least in part, on the set of user selections, wherein the privacy score is computed based, at least in part, on an impact on user privacy of the selections belonging to the set; and
computing an individualized cost score based, at least in part, on the privacy score, wherein the individualized cost score is based, at least in part, on identified characteristics specific to the user.

13. The apparatus of claim 12, wherein the selections relate to sharing of data categories and wherein the individualized cost score comprises applying a weighting to at least one of the data categories.

14. The apparatus of claim 13, wherein the weighting is based on user sensitivity to sharing of data in the at least one of the data categories.

15. The apparatus of claim 11, further comprising determining that an arrangement has been reached for data sharing between the user and a service provider and collecting data from at least one sensor of a user device in accordance with the arrangement, wherein collecting data from the at least one sensor comprises optimizing collection of data so that only data required to comply with the arrangement is collected.

16. A non-transitory computer readable medium storing a program of instructions, execution of which by a processor configures an apparatus to perform actions comprising at least:
assembling a set of user selections for sharing of user data, wherein the user selections belonging to the set are chosen from among alternatives affording varying degrees of privacy to the user;
presenting the user selections in a negotiation of terms for data sharing between the user and a service provider, wherein the negotiation of terms comprises offering of incentives by the service provider in exchange for data access and offering of data access by the user;
in response to receiving updates to the user and provider specifications and to the information identifying incentives as they are updated during a negotiation between the user and the service provider, presenting the updated user and provider specifications and the information identifying incentives as needed in furtherance of the negotiation.

17. The non-transitory computer readable medium of claim 16, wherein the actions further comprise computing a privacy score based on the user selections belonging to the set, wherein the privacy score is computed based on the impact of the selections on user privacy and computing an individualized cost score based at least in part on the privacy score, wherein the individualized cost score is based at least in part on identified characteristics specific to the user.

18. The non-transitory computer readable medium of claim 17, wherein the selections relate to sharing of data categories and wherein the individualized cost score comprises applying a weighting to at least one of the data categories.

19. The non-transitory computer readable medium of claim 18, wherein the weighting is based on user sensitivity to sharing of data in the at least one of the data categories.

20. The non-transitory computer readable medium of claim 16, further comprising determining that an arrangement has been reached for data sharing between the user and a service provider and collecting data from at least one sensor of a user device in accordance with the arrangement, wherein collecting data from the at least one sensor comprises optimizing collection of data so that only data required to comply with the arrangement is collected.

\* \* \* \* \*